(12) United States Patent
Choudhury et al.

(10) Patent No.: US 10,470,971 B2
(45) Date of Patent: Nov. 12, 2019

(54) GARMENT WITH REMOTE CONTROLLED VIBRATION ARRAY

(71) Applicants: Sambhu Choudhury, Cincinnati, OH (US); Monika Lalani Rathnayake, Cincinnati, OH (US)

(72) Inventors: Sambhu Choudhury, Cincinnati, OH (US); Monika Lalani Rathnayake, Cincinnati, OH (US)

( * ) Notice: Subject to any disclaimer, the term of this patent is extended or adjusted under 35 U.S.C. 154(b) by 0 days.

(21) Appl. No.: 15/960,503

(22) Filed: Apr. 23, 2018

(65) Prior Publication Data
US 2018/0243163 A1     Aug. 30, 2018

Related U.S. Application Data

(63) Continuation-in-part of application No. 14/216,909, filed on Mar. 17, 2014, now Pat. No. 9,949,890.
(Continued)

(51) Int. Cl.
*A61H 23/02*     (2006.01)
*G06F 3/0488*   (2013.01)
(Continued)

(52) U.S. Cl.
CPC ............. *A61H 23/02* (2013.01); *A61H 19/30* (2013.01); *G06F 1/163* (2013.01); *G06F 3/011* (2013.01); *G06F 3/016* (2013.01); *G06F 3/0416* (2013.01); *G06F 3/04847* (2013.01); *G06F 3/04883* (2013.01); *H04M 1/72533* (2013.01); *A61H 2201/165* (2013.01); *A61H 2201/1645* (2013.01); *A61H 2201/501* (2013.01); *A61H 2201/5002* (2013.01); *A61H 2201/5012* (2013.01); *A61H 2201/5028* (2013.01); *A61H 2201/5046* (2013.01); *A61H 2201/5071* (2013.01); *A61H 2205/06* (2013.01); *A61H 2205/082* (2013.01); *A61H 2205/087* (2013.01);
(Continued)

(58) Field of Classification Search
CPC ......... A61H 23/00; A61H 1/00; H04W 4/008; H04B 3/36; G06F 3/041; G06F 3/01; G06F 3/0488
USPC ........... 340/407.2, 4.1, 4.12, 4.13, 7.6, 7.61; 455/567; 345/159, 173, 160; 700/17, 21, 700/78, 79, 83, 275
See application file for complete search history.

(56) References Cited

U.S. PATENT DOCUMENTS

| | | | |
|---|---|---|---|
| 6,731,202 B1 * | 5/2004 | Klaus ..................... | B60O 1/525 340/425.5 |
| 6,847,892 B2 * | 1/2005 | Zhou ..................... | G01S 5/0027 340/426.1 |

(Continued)

*Primary Examiner* — Nam V Nguyen
(74) *Attorney, Agent, or Firm* — Jenei LLC

(57) ABSTRACT

A communication system and method are provided for remotely reproducing a touch pattern or gesture as a vibrotactile output. At a touch screen, a first user device receives a touch pattern by a first user, characterizes the touch pattern as a touch pattern data based upon time and intensity of touch at a plurality of array points of the touch screen, and communicates the touch pattern data to a network. A tactile array patch of micro-vibratory devices is attachable to a garment and worn by a second user. The touch pattern data is wirelessly received from the first user device via the network. Vibration of selected micro-vibratory devices of the tactile array is modulated in timing and intensity in response to the touch pattern data to reproduce the touch pattern.

16 Claims, 7 Drawing Sheets

Related U.S. Application Data

(60) Provisional application No. 61/798,854, filed on Mar. 15, 2013, provisional application No. 61/814,701, filed on Apr. 22, 2013.

(51) Int. Cl.
*G06F 1/16* (2006.01)
*A61H 19/00* (2006.01)
*G06F 3/0484* (2013.01)
*G06F 3/041* (2006.01)
*H04M 1/725* (2006.01)
*G06F 3/01* (2006.01)

(52) U.S. Cl.
CPC .. *A61H 2230/08* (2013.01); *G06F 2203/0383* (2013.01); *G06F 2203/04102* (2013.01); *G06F 2221/2111* (2013.01); *G08C 2201/42* (2013.01); *H04M 1/72572* (2013.01)

(56) References Cited

U.S. PATENT DOCUMENTS

| | | | | |
|---|---|---|---|---|
| 6,930,590 B2* | 8/2005 | Ling | ................ | G06F 3/016 310/319 |
| 7,292,227 B2* | 11/2007 | Fukumoto | .......... | G01C 21/3664 178/18.04 |
| 8,279,053 B2* | 10/2012 | Ryu | ................ | G06F 3/016 340/4.1 |
| 8,279,193 B1* | 10/2012 | Birnbaum | ............. | G06F 3/016 345/173 |
| 8,344,847 B2* | 1/2013 | Moberg | ............. | G06F 19/3418 340/3.2 |
| 8,362,883 B2* | 1/2013 | Hale | ................ | G09B 21/003 340/407.1 |
| 8,493,354 B1* | 7/2013 | Birnbaum | ............. | G06F 3/016 345/173 |
| 8,527,041 B2* | 9/2013 | Crompvoets | ...... | A61B 5/02438 600/509 |
| 8,941,476 B2* | 1/2015 | Hill | ................ | G06F 3/016 340/407.1 |
| 9,298,260 B2* | 3/2016 | Karaoguz | ............. | G06F 3/016 |
| 9,436,282 B2* | 9/2016 | Levesque | ............. | G06F 3/016 |
| 9,949,890 B2* | 4/2018 | Choudhury | ............ | A61H 23/00 |
| 2004/0100376 A1* | 5/2004 | Lye | .................... | A61B 5/411 340/539.12 |
| 2011/0148626 A1* | 6/2011 | Acevedo | ............. | G01S 5/0027 340/539.13 |
| 2011/0254703 A1* | 10/2011 | Li | ................ | G08G 1/005 340/944 |
| 2012/0218090 A1* | 8/2012 | Rothschild | ............. | G08B 6/00 340/407.1 |
| 2018/0093610 A1* | 4/2018 | Sun | .................... | B60R 11/02 |
| 2018/0151037 A1* | 5/2018 | Morgenthau | ........ | G08B 25/016 |

* cited by examiner

GARMENT WITH REMOTE CONTROLLED VIBRATION ARRAY

CROSS-REFERENCE TO RELATED APPLICATION

This application is a continuation-in-part of U.S. Non-provisional application Ser. No. 14/216,909 entitled "Garment with Remote Controlled Vibration Array", now U.S. Pat. No. 9,949,890 which in turn claims priority to U.S. Provisional Application Ser. No. 61/798,854, filed Mar. 15, 2014 and of U.S. Provisional Application Ser. No. 61/814,701 filed Apr. 22, 2013, the contents of which are fully incorporated herein by reference.

BACKGROUND OF THE INVENTION

Field of the Invention

The field of art disclosed herein pertains to vibratory stimulation devices that are remotely actuated.

Description of the Related Art

Remotely controlling a stimulation device can be relegated to sexual toys but may also be helpful in improving perception, function, learning, and training in any situation that requires a sensory stimulus.

Vibrating sex toys, also known as "vibrators", are typically equipped with fader-style controls that allow a user to vary the intensity of an electric vibrator motor, thereby altering the sensations produced by the toy. Unfortunately, controls in a vibrator sex toy are not optimal because they are distractions from the very sensations they control and are not controlled remotely. A more natural and ergonomic method of controlling a massaging or vibrator sex toy in a remote fashion is sought.

Sensory feedback is sought in a variety of methods with sensors that allow for identification of everything from grip on a steering wheel to application of force though a tennis racquet for a professional athlete. The ability to remotely deliver signals to the user of the tennis racquet or steering wheel is sought.

SUMMARY OF THE INVENTION

Disclosed are communication system and a method for reproducing a touch pattern or gesture by a first user received on a first user device on a second user device that includes a tactile array attached to a garment worn by a second user.

According to one aspect, a communication system is provided for remote vibrotactile interaction. In one or more embodiments, the communication system comprising a first and second user device. The first user device comprises: (a) a communication interface to communicate to a network; and (b a first vibrotactile controller in communication with the communication interface and the user interface device and that executes: (i) an alert generating application; and (ii) a tactile alert utility that causes the first user device to perform acts. The acts include: (a) determine whether the alert generating application has generated the alert; (b) associate the alert with modulated timing and intensity of vibration of selected micro-vibratory devices of a tactile array; and (c) transmit the tactile output alert to the second user device. The second user device includes: (a) a surface that is one of: (i) worn in contact to a user; and (ii) supports the user; (b) a tactile array of micro-vibratory devices attachable as a first vibration textile to a portion of the surface in contact at least intermittently with the user; (c) a communication receiver to wirelessly receive the tactile output alert from the first user device via the network, and (d) a second vibrotactile controller responsive to the received tactile output alert to modulate timing and intensity of vibration of selected micro-vibratory devices of the tactile array to communicate a tactile version of the alert.

According to one aspect of the present disclosure, a method is provided of remote vibrotactile interaction between user devices. In one or more embodiments, the method includes: (a) determining whether an alert generating application of a first user device has generated an alert; (b) associating the alert with modulated timing and intensity of vibration of selected micro-vibratory devices of a tactile array; and (c) transmitting the tactile output alert to a second user device that modulates timing and intensity of vibration of selected micro-vibratory devices of the tactile array to communicate a tactile version of the alert to a user that is in contact to the tactile array.

These and other features are explained more fully in the embodiments illustrated below. It should be understood that in general the features of one embodiment also may be used in combination with features of another embodiment and that the embodiments are not intended to limit the scope of the invention.

BRIEF DESCRIPTION OF THE FIGURES

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
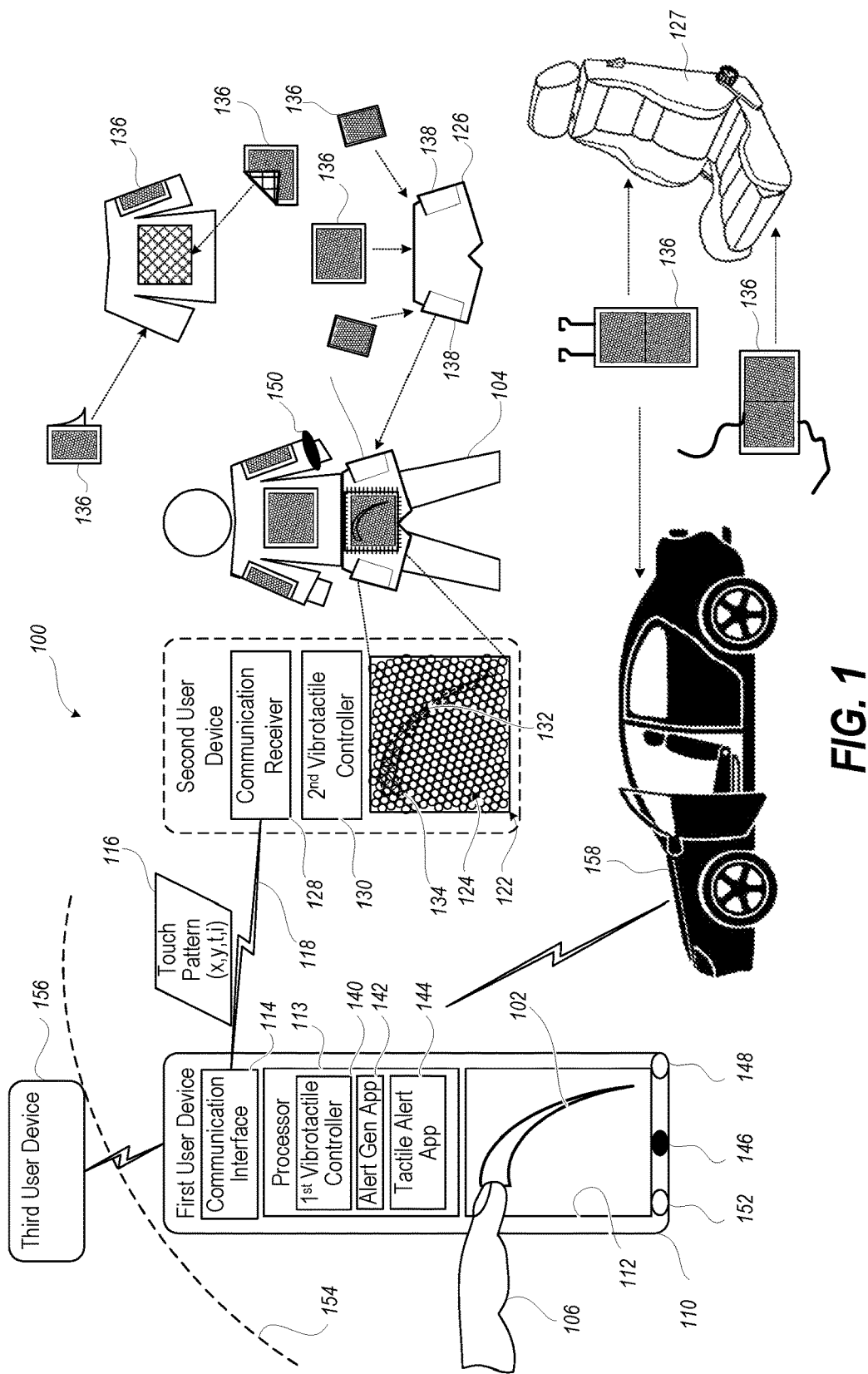
FIG. 1 illustrates a block diagram of an example communication system for remotely communicating vibrotactile interaction within which various aspects of the disclosure can be implemented, according to one or more embodiments.

The present invention relates to a stimulatory device with a plurality of sensory nodes placed adjacent to the skin. The device can be used for sexual or nonsexual communication with another individual. Control of the device is achieved with multiple possible sources including Bluetooth (BT), wireless, or remote-control actions. The device allows for access to any combination of nodes that is determined remotely by the controller of the device. The wearer of the sensory nodes would feel one or multiple nodes activated remotely sequentially or in patterns determined by the controller. Levels of activity of the nodes would be determined by the controller; therefore, defining the strength of the stimulus. Patterns would simulate touch, poke, push or stroke and would be developed by the controller of the device.

A gesture can refer to a predefined movement across the touch screen of a device, such as a mobile telephone. An example of a gesture is a swipe of a finger from corner-to-corner of the touch screen. This gesture, or others like it, can trigger the device to perform a particular function, such as performing a search on the device. Other programs also employ gesture-based control. For example, the FIREFOX Web browser can be configured, using third-party plug-ins, to react to commands input by predefined mouse gestures.

Current devices are able to provide a pattern of stimulus that is related to the programming of the mechanical device. Whether the device is vibratory, electric or pressure, the determined action is a single, single continuous, or alternating and/or sequential action that is predetermined. This allows the user to have a response or action based upon a finite set of stimuli. The controller of the current device is usually the individual him/herself or in the case of a remote access, usually a nearby partner that is able to use basic functionality of duration, number or timing of sequences.

The devices that are used for stimulation include various sexual devices for the male and female, massagers, entertainment mechanisms (such as chairs) that allow spectators to feel alterations in the device that correlate to and reflect visual stimuli (i.e. movie scenes). Additional usage of the device could be for training athletes, adjusting motions or activities for military operation, nonverbal communication for soldiers or musicians, application to the handicapped especially the hearing or visually impaired to allow more complete experiences for multiple venues.

The present invention is able to allow the operator to create an infinite number of translated stimuli with the use of multiple nodes of response and variations in the responses. The simulation of touch can be done through processors that allow for the action reflexively to be translated in the multiple stimulation receivers in the end device.

According to one aspect, a communication system comprises a first user device having a touch screen to receive a touch pattern by a first user and to characterize the touch pattern as a touch pattern data based upon time and intensity of touch at a plurality of array points of the touch screen. The first user device has a communication interface to communicate the touch pattern data to a network. A second user device comprises a tactile array of micro-vibratory devices attachable to a garment, a communication receiver to wirelessly receive the touch pattern data from the first user device via the network, and a vibrotactile controller responsive to the received touch pattern data to modulate timing and intensity of vibration of selected micro-vibratory devices of the tactile array to reproduce the touch pattern.

According to another aspect, a method for remotely reproducing a touch pattern or gesture as a vibrotactile output. At a touch screen, a first user device receives a touch pattern by a first user, characterizes the touch pattern as a touch pattern data based upon time and intensity of touch at a plurality of array points of the touch screen, and communicates the touch pattern data to a network. A tactile array of micro-vibratory devices is attached to a garment and worn by a second user. The touch pattern data is wirelessly received from the first user device via the network. Vibration of selected micro-vibratory devices of the tactile array is modulated in timing and intensity in response to the touch pattern data to reproduce the touch pattern.

Turning now to the Drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details. In some instances, well-known structures and components are shown in block diagram form in order to avoid obscuring such concepts.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions, and the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

With initial reference to FIG. 1, a communication system 100 according to at least one aspect of the present disclosure enables remote reproduction of a touch pattern 102 (gesture) on a second user 104 (touch recipient) by a first user 106 (touch generator). A first user device 110 has a haptic input device, depicted as a touch screen 112, to receive the touch pattern 102 by the first user 106. A processor 113 of the first user device characterizes the touch pattern 102 as a function of time and intensity of touch at each of a plurality of array or pixel points of the touch screen 112. A communication interface 114 of the first user device 110 communicates touch pattern data 116 based on the characterization of the touch pattern 102 to a network 118.

A second user device 120 used by the second user 104 includes a tactile array 122 of micro-vibratory devices 124 that is attachable (i.e., temporarily or permanently) to a worn item, depicted as a garment 126 or a car seat 127. It should be appreciated that the garment 126 provides holds the tactile array 122 directly or indirectly in contact with the skin of the second user 104. A communication receiver 128 wirelessly receives touch pattern data 116 from the first user device 110 via the network 118. A second vibrotactile controller 130 responds to the received touch pattern data 116 to by modulating timing and intensity of vibration of selected micro-vibratory devices 132 of the tactile array 122 to generate a reproduction touch pattern 134.

In one or more embodiments, one or more tactile arrays 122 are formed as vibration fabric sections 136 that are attachable and detachable from a range of surfaces that contact the user or that support the user. Vibration fabric sections 136 can be attached by stitching, zippering, pocketing in garment pockets 138, adhering, stapling, riveting, hooking, or strapping etc. Vibration fabric 136 can extend across opposing sides of user 104 so that directional information can be conveyed. Alternatively, multiple vibration fabric sections 136 can be positioned on opposing sides to provide selective activation.

In one or more embodiments, communication system 100 is for remote vibrotactile interaction to provide tactile alerts. The first user device 110 includes the first communication interface 114 and a first vibrotactile controller 140 in communication with the communication interface 114. The first vibrotactile controller 140 executes: (i) an alert generating application 142; and (ii) a tactile alert utility 144 that causes the first user device 110 to determine whether the alert generating application 142 has generated the alert. The tactile alert utility 144 associates the alert with modulated timing and intensity of vibration of selected micro-vibratory devices 132 of a tactile array 122 of one or more vibration fabric 136. Communication interface 114 transmits the tactile output alert to the second user device 120.

The vibratory motors or other technology can be arranged in any practical arrangement such that the touch screen gestures are translated into multi-dimensional vibrations across the array. Actuators that apply forces to the skin for touch feedback, and controllers enable Haptics. The actuator provides mechanical motion in response to an electrical stimulus. Most early designs of haptic feedback use electromagnetic technologies such as vibratory motors, like a vibrating alert in a cell phone or a voice coil in a speaker, where a central mass is moved by an applied magnetic field. These electromagnetic motors typically operate at resonance and provide strong feedback but produce a limited range of sensations and typically vibrate the whole device, rather than an individual section. Second generation haptics offered touch-coordinate specific responses, allowing the haptic effects to be localized to the position on a screen or touch panel, rather than the whole device. Second generation haptic actuator technologies include electroactive polymers, piezoelectric, electrostatic and subsonic audio wave surface actuation. Third generation haptics deliver both touch-coordinate specific responses and customizable haptic effects. The customizable effects can be created using low latency control chips. A new technique that does not require actuators is called reverse-electrovibration. A weak current is sent from a device on the user through the object they are touching to the ground. The oscillating electric field around the skin on their fingertips creates a variable sensation of friction depending on the shape, frequency, and amplitude of the signal.

In one or more embodiments, the alert generating application that generates the alert comprises a pedestrian proximity alert of an approaching vehicle. In one or more embodiments, first user device 110 comprises a microphone 146 that detects audio alerts in an ambient environment. The alert generating application 142 generates the alert comprises an audio-to-tactile alarm converter that categorizes any audio alerts detected by the microphone.

Proximity warning systems may indicate the relative proximity between a first object and a second object. In some applications, objects may move relative to a person without the person's awareness. In some cases, this may pose a safety hazard to either the person, the object, which may also be a person, or to the person's property. In other applications there may be a benefit in a person knowing the distance between themselves and the other person or object. Many automobiles contain proximity warning systems, or parking assistance systems that help the driver to avoid collisions with nearby objects and that include the use of audible feedback. In one or more embodiments, the present invention provides for a proximity warning system wherein the warning is transmitted to a person through a vibrotactile sensation. In one or more embodiments, the first user device 110 comprises a proximity sensor that is capable of sensing the nearness, closeness, or proximity of an object to the device. In one or more embodiments, the pattern, intensity and location of the transmitted vibrations may be individualized to indicate the nearness, direction, movement, speed and proximity of an object to the device.

The proximity warning system may contain a distance estimator that may determine an indicator of the distance between the automobile, or first object, and the person, or second object. The distance estimator associated with the device may utilize one or more external sensors that may detect objects. External sensors may include, for example, ultrasound, magnetic sensing, radio detection and ranging (RADAR), light detection and ranging (LIDAR), optical and infrared. One or more of the vibrotactile transducers may emit a proximity warning generated by the proximity warning system responsive to the determined distance indicator.

In one or more embodiments, in which the system for enhancing a proximity warning may be used in which an object may have moved closer to the person. One or more of the vibrotactile transducers may emit a proximity warning signal generated by the proximity warning system responsive to the determined distance indicator. The proximity warning emitted by the transducers may be different for closer objects indicating that the person or second object is in closer proximity to the first object. The proximity warning may utilize properties of vibrations to indicate proximity or the severity of a situation. The pitch, amplitude and/or repetition rate of the proximity warning may be modified to indicate proximity. For example, the proximity warning may increase the repetition rate or pitch of the proximity warning sound to indicate the proximity from the automobile to the second object. In this description and the claims that follow references to indications of proximity may be understood to include estimations or approximations of either absolute or relative proximity. Where proximity may be understood to be a measure of distance between a first and a second object or point of reference. Further any reference to a measure of distance is not limited to a single linear measure of distance but may include measures of distance in multiple dimensions.

The proximity warning generated may in addition optionally indicate perceptually the orientation and/or position of the second object relative to the position of the first object. An orientation indicator may be determined for the orientation of the second object relative to the first 102 using, for example, the one or more external sensors. Orientation of the second object relative to the first object may also be known as a direction or bearing. For example, the proximity warning may be spatialized using the transducers so that the user perceives the proximity warning sound to be emanating from behind and to the left of the user. Spatializing the proximity warning sound may further inform the user that the object is, for example, behind and to the left of the user. Proximity warning systems in an automobile may include, for example, parking and reversing assistance systems, pedestrian and object detection systems, blind-spot warning system, and lane departure warning systems. Further examples of proximity vibrations that may be generated by a system for enhancing a proximity warning include a vibration pattern modified to indicate the distance to the location of a calling party.

A relative ratio of reverberations is a further property of vibration that may be intrinsically linked to proximity and therefore potentially be more perceptually intuitive to a human listener than modifying the pitch, amplitude and/or the repetition rate of the proximity warning vibration.

The proximity warning may include the reverberation component in addition to modified vibration properties including, for example, pitch, amplitude and repetition rate. Utilizing the reverberation components to indicate proximity may add a useful dimension to help indicate proximity to an object in an intuitive manner and without jarring, frightening, or otherwise be distracting to a user. Further the inclusion of reverberation components in the proximity warning sound may allow the user to intuitively perceive a sense of indicated distance to an object (e.g. second object) while mitigating the need for familiarization or learning on the part of the user.

In one or more embodiments, first user device 110 comprises: (i) a motion sensor 148 that detects whether the user 104 is in a moving vehicle; and (ii) a biosensor 150 that detects a physiological value of the user that correlates to a level of alertness. The alert generating application 142 generates the alert is in communication with the motion sensor 148 and the biosensor 150 and comprises a drowsy driver alarm generator.

In one or more embodiments, first user device 110 comprises a geographic location finder 152 that detects where the first user device 110 is located relative to another device or according to geospatial coordinates. The alert generating application 142 generates the alert is in communication with the geographic location finder 152 and comprises a geofence application that generates the alert in response to a violation of a geofence limitation 154. In a particular embodiment, the communication interface 114 is in communication with a third user device 156 of another user that is associated with the geofence limitation 154. The alert generating application 142 generates the alert in response to the violation of the geofence limitation 154 by the third user device 156.

Whilst the above has been described mainly in terms of monitoring of individual subjects, it will be appreciated that the same kind of monitoring and alert signaling can be applied to groups such as police and military units. In one or more embodiments, an emergency situation detection apparatus with a vibrotactile alert can be used.

In an embodiment there is provided an alarm state manager to provide immediate indication of an emergency state. The alarm state manager is preferably also able to enter an alarm state under the influence of other detectors. The alarm state manager may be able to enter different levels of alarm states prompting different actions. In a further embodiment the emergency situation detector includes a GPS detector to provide positioning information. A further embodiment intended for a user who stays within a predefined area, such as a police car on patrol, simply sends regular vibrotactile signals that he is in position.

In a further preferred embodiment, emergency situation detectors are provided to two or more vehicles in a team. According to a further embodiment a system comprises rule based logic. The subject vehicle is expected to follow certain rules, for example a police patrol car patrols within a certain area. If the vehicle were to begin speeding, or move outside the area it would be apparent that an abnormal situation may have arisen. Should the vehicle suddenly decelerate and then cease to move at all then something is wrong. Should the vehicle suddenly accelerate upwards and then fall down, followed by ceasing to move then it would be apparent that the vehicle has struck a mine. Thus, the sensor is usable in combination with the rule based logic to detect non-compliance with the behavioral rules, to indicate an abnormal situation and if necessary to set off an alarm to other users.

The system may be set to await an additional indication such as an impact or the sound of an explosion, or signs of rolling or the like or an indication of an impact, which may indicate that the vehicle is under attack.

In a preferred embodiment, the detectors are programmable. The rules can be changed for different users or for allowing the same device to given to different vehicles having different requirements. Thus aircraft and ships would have different expected behavior and indicators of danger than land vehicles, and land vehicles may differ between military and civilian vehicles. A civilian vehicle may usefully be programmed to detect an apparently drunk or asleep driver. The device can also be dynamically programmable according to parameters it is able to detect. Thus it may be able to use detected locations to change between different sets of rules. In an example the change of rules may be carried out on line, for example over a radio connection. A position or location detector may be used in combination with the above system and the rules preferably define location based behaviors. The cellular system can provide location information.

The behaviors that may be defined include a crash, an under-vehicle explosion, a side-of vehicle explosion, a behind-vehicle explosion, an above-vehicle explosion, and a driver losing control. In addition features such as the sound of the explosion could be detected to be taken as confirmation. If there is a sound detector then it is also possible to detect the sound of breaking glass. Breaking glass can also be an indicator of someone attempting to break into the vehicle when not in use. A flash fire may be detected or a shock wave or smoke or other indications of an explosion or fire.

Herein the term "tactical information" is referred to as information describing the tactical environment in which the vehicle operate. In more detail the term "tactical information" relates to information that at least comprise information describing a position of at least one tactical object and/or area which is present and/or presumed present and/or presumed to be present in the surroundings of the combat vehicle. The tactical information may be information gathered historically and/or information gathered in real time or close to real time. The tactical information may be gathered by means of visual observation with and/or without aid, such as sensors etc., from for example a troop/vehicle. The tactical information may also be automatically gathered and processed by means of sensor systems provided with or coupled to data processing means. The tactical information may also be gathered by means of satellite/aerial surveillance or other suitable surveillance method. The tactical information may also be gathered by means of a geo-data gathering system alternatively provided by a geo-database. The tactical information may also relate to order from for example a command center or a vehicle commander, wherein said order relates to at least one tactical object and/or area, such as an order in the form of fire onto a first tactical object and/or area in the form of an enemy target such as a tank positioned at coordinates (X1,Y1,Z1) or advance to a first firing position area positioned at coordinates (X2,Y2,Z2), or advance along a first route with waypoint coordinates (W1,W2,W3). Apart from information relating to type of tactical object/area the tactical information may also comprise one or more instant of time for example describing when different parts of the tactical information is gathered and/or instants of time relating to order issuance, execution of orders etc. The tactical information may also relate to so called intelligence information.

Herein the term "tactical object" relates to an example of tactical information which relates to information describing a position and/or type of a tactical object, wherein said tactical object may be comprised of at least one unit of enemy and/or own troop in the form of an object of a group of objects at least comprising: an aircraft, an infantry soldier; a vehicle; or a building.

With position of a tactical object is meant one or more geographic coordinates representing the location and/or extent of the object. With type of object is meant information describing the characteristics of the object, i.e. for example tank, helicopter etc., of own of enemy troop according to the examples above. It should be appreciated that this list of object is only intended to exemplify what may constitute a tactical object, i.e. more types of objects than the above mentioned may constitute a tactical object.

Herein the term "tactical area" relates to an example of tactical information which relates to information describing position and/or type of a tactical area which may be comprised of at least one area of a group of areas at least comprising: an observation area, a firing area, an area with particular ground characteristics, a protection area, a re-grouping area, an advancement area, a civilian area, an enemy area, etc.

With position of a tactical area is meant one or more geographical coordinates representing the location/extent of the area. With type of area is meant information describing the characteristics of the area i.e. for example civilian area, firing position area etc. according to the examples above. It should be appreciated that this list of areas only is intended to exemplify what may constitute a tactical area, i.e. more types of areas that the above mentioned may constitute a tactical area.

The tactical information is mainly comprised of information relating to position and/or type of at least one tactical object and/or area. It can be mentioned as an example of information relating to a tactical object information describing a confirmed of presumed geographical position of an object.

In one or more embodiments, first tactical object comprises a geographic location finder that detects where the first tactical object is located relative to another device or according to geospatial coordinates within a tactical area. The alert generating application generates the alert is in communication with the geographic location finder and comprises a geofence application that generates the alert in response to a violation of a tactical information limitation. In a particular embodiment, the communication interface is in communication with a third tactical object of another user that is associated with the tactical information limitation. The alert generating application generates the alert in response to the tactical information by the third tactical object.

In one or more embodiments, the communication interface 114 comprises a vehicle warning interface that receives directional vehicle proximity warnings from a vehicle 158. The tactile output alert from the tactile alert application 144 contains directional information in selecting one of more than one vibration textiles sections 136 based on what side of the user 104 is to be tactile alerted.

In one or more embodiments, the biosensor 150 detects a physiological value of the user that correlates to a monitored health condition such as heart rate, pulse, breathing rate, blood pressure, oxygen saturation, blood sugar, electrocardiogram, etc. The alert generating application 142 generates the alert is in communication with the biosensor 150 and comprises a health alert generator. Biosensors that include subject activity sensors generally detect tangible medical or physical condition or information indicative of a subject's overall health, as well as statistically significant changes in measurements or conditions with time that may indicate changes in the subject's health, such as a worsening heart failure condition.

In one embodiment, the device includes at least one subject activity sensor. For example, subject activity sensor may include at least one accelerometer that can indicate accelerating and decelerating movements. For example, a subject wearing treatment device 100 can participate in normal activities, such as standing, walking, sitting, running, and generally moving about as part of day-to-day life when partaking in physical, labor, and leisure activities. Because of the nature of human movements, generally comprising short distance and short duration, accelerometers provide useful information about subject movement and activity. A controller can use this information to determine if treatment is necessary or should be adjusted, if quality of life recommendations should be made to the subject (e.g., a suggestion to change dietary or activity habits,) or if a doctor should be consulted. In some embodiments, activity sensors include single axis accelerometers as well as multi-axis sensors.

In one embodiment, the plurality of sensors include at least one cardiac sensing electrode, a subject activity sensor, such as an accelerometer, or other sensor configured to provide information to a controller relating to the subjects cardiac information (e.g., ECG), or activity wellness (e.g., motion or position). For example, a biosensor can sense and provide information about the subject's body state—e.g., vertical, horizontal, lying down on left side, lying down on right side, moving in a recitative pattern, vibrating due to environmental causes such as during a car ride, convulsing due to health causes such as a cardiac event or seizure, accelerating, decelerating, falling, and component acceleration or mechanical shock, (e.g., sensor disconnects from the subject and falls or impacts the ground or a hard surface due to gravitational or other forces).

In one embodiment, medication reminders prompt the subject to take medication through vibrotactile signals. For example, the device can convey to the subject what medication to take, and when. In one embodiment, the device issues a vibration prompt to remind the subject to take a certain medication and a certain time. After taking the medication, the subject can inform treatment device of this fact via a user interface.

The tactile or haptic alarm can alert the subject as well as bystanders. The alarm module can provide indicators of the subject's condition, such as heart or respiration rates, volume, or timing, or the subject's pulse, as well as heart failure indicators and coronary sounds.

In one embodiment, the vibrotactile alarm provides an alarm after a sensor detects cardiac information about the subject, and before a treatment device applies treatment to the subject. The alarm module can also provide a further alarm after treatment has been applied to the subject.

The present techniques envision use of one or more sensors proximate to the user (also referred to herein as proximal sensors). These are sensors that can measure physical/physiological conditions of the user. These types of sensors generally require contact with the user to function, and thus are also referred to herein as contact sensors. For instance, one such contact sensor is an electrodermal activity or EDA sensor. EDA sensors measure the electrical characteristics of the skin. The electrical characteristics of the skin are controlled, at least in part, by the state of sweat glands in the skin, which in turn are regulated by the sympathetic nervous system. Thus, EDA sensors can gauge sympathetic and nervous responses.

In one or more embodiment, based on a sweat gland circuit-loop, EDA measures strength of change in skin conductance to electrical charge as reflecting sympathetic nervous system response to sensation. This change is associated with eccrine sweat-gland activity innervated by the sympathetic branch of the autonomic nervous system.

In the context of the present techniques, EDA sensors can be used to collect real-time data indicating a level of stress of the user, e.g., the driver is in a relaxed or high-anxiety/stress state. For instance, based on the above-described sensory stimulus, the driver might be under stress when he/she is driving aggressively, is in an accident, witnesses an accident or other hazardous road condition (e.g., other motorists around them driving improperly or speeding, slick road conditions, debris on the road, etc.), based on the above-described sensory stimulus. Other contact sensors useful for the present techniques include pulse oximeters and heart rate sensors. A pulse oximeter measures a person's blood oxygen levels often via a sensor placed on a part of the body such as a fingertip. Similarly, a heart rate sensor measures a person's heart rate or pulse (generally in beats per minute), e.g., via a sensor placed on the chest or wrist.

With regard to the present techniques, the user's pulse/heart rate may be indicators of stress. As described above, user stress may be caused by their driving condition and/or that of others, conditions and hazards, etc. These vitals are also indicators of impairment conditions, such as when the user is experiencing a medical condition like a heart condition. It is assumed that under normal conditions, a user will have a constant pulse/heart rate. Thus, drastic changes (spike or dip) in user pulse/heart rate can be indicators of hazardous conditions.

Other useful proximal sensors are trajectory and pose sensors. For instance, an accelerometer can be used to detect the user's movement, speed and direction. A gyroscope sensor (often used in conjunction with an accelerometer) detects direction or orientation. A rate gyroscope similarly measures the rate of change of angle with time. A global positioning system or GPS provides location information.

With regard to the user's movements (detected, e.g., via the gyroscope/accelerometer), as provided above, data related to the user's arm motion while driving can be useful. For instance, rapid side-to-side arm motions might indicate weaving and/or other types of aggressive driving that might indicate a hazardous situation. For example, a driver that is weaving in and out of traffic is more likely to be involved in (or cause) an accident. Thus, when this type of driving behavior is detected, the driver might be prompted with an vibrotactile alert to "slow down" or "maintain safe driving practices." Uncharacteristic arm movements might also indicate that the driver is doing something other than focusing on driving. For instance, the driver might be talking to a passenger and gesturing with his/her arm rather than gripping the steering wheel, the driver might be reaching for items in the vehicle, etc. All of these activities can lead to unsafe driving conditions.

A gyroscope sensor can provide data useful for detecting unusual occurrences. For instance, a sudden veering to the left or right might indicate that the driver has accidentally moved out of his/her lane or off of the road, is making drastic lane changes, is experiencing slick road conditions, etc.

GPS sensors provide a convenient way to determine the speed at which the driver (and thus the vehicle) is travelling. Speedometer capabilities are present in many current GPS modules. Thus, if the present system detects that the driver is speeding (e.g., based on current location and posted speed limits, size/type of road, weather/environmental conditions, etc. for that location), then an alert may be provided to the user in the above-described manner to, e.g., "slow down."

Yet another type of sensor that is useful for the present techniques is an environmental sensor. For instance, a compass and/or a magnetometer (which measures the direction of magnetic fields) can be used to determine the physical position of the user. A barometer, air temperature sensors, wind speed sensors, humidity sensors, etc. can be used to assess environmental conditions such as air pressure, temperature, wind velocity etc.

For instance, environmental sensors can be used to assess the weather conditions which can directly impact walking and driving conditions. Low temperatures in combination with high humidity can be indicators of (ice, snow, etc.) slick conditions. While the sensors might be measuring the environment within the vehicle, it is possible to tie into the vehicle's sensor system, which oftentimes includes a sensor for temperatures outside of the vehicle. Useful data can also be collected via a microphone.

Standard data fusion techniques may be employed to analyze the data collected from different sensors together. For instance, a driver's (e.g., side-to-side) hand movements (detected via accelerometer) in combination with speed (detected via GPS) may be used to determine whether the driver is weaving, a combination of vibrations (detected via accelerometer) and audio (detected via the microphone) may be used to determine distracted driving (such as when the driver is distracted by music within the vehicle and veers off the road onto warning strips on the shoulder), repeated stopping and acceleration (detected via accelerometer) in combination with road type (detected via GPS location) and/or driver physiological conditions such as heart rate and pulse (detected via heart rate and EDA sensors) can be used to determine tailgating.

Figure 2:
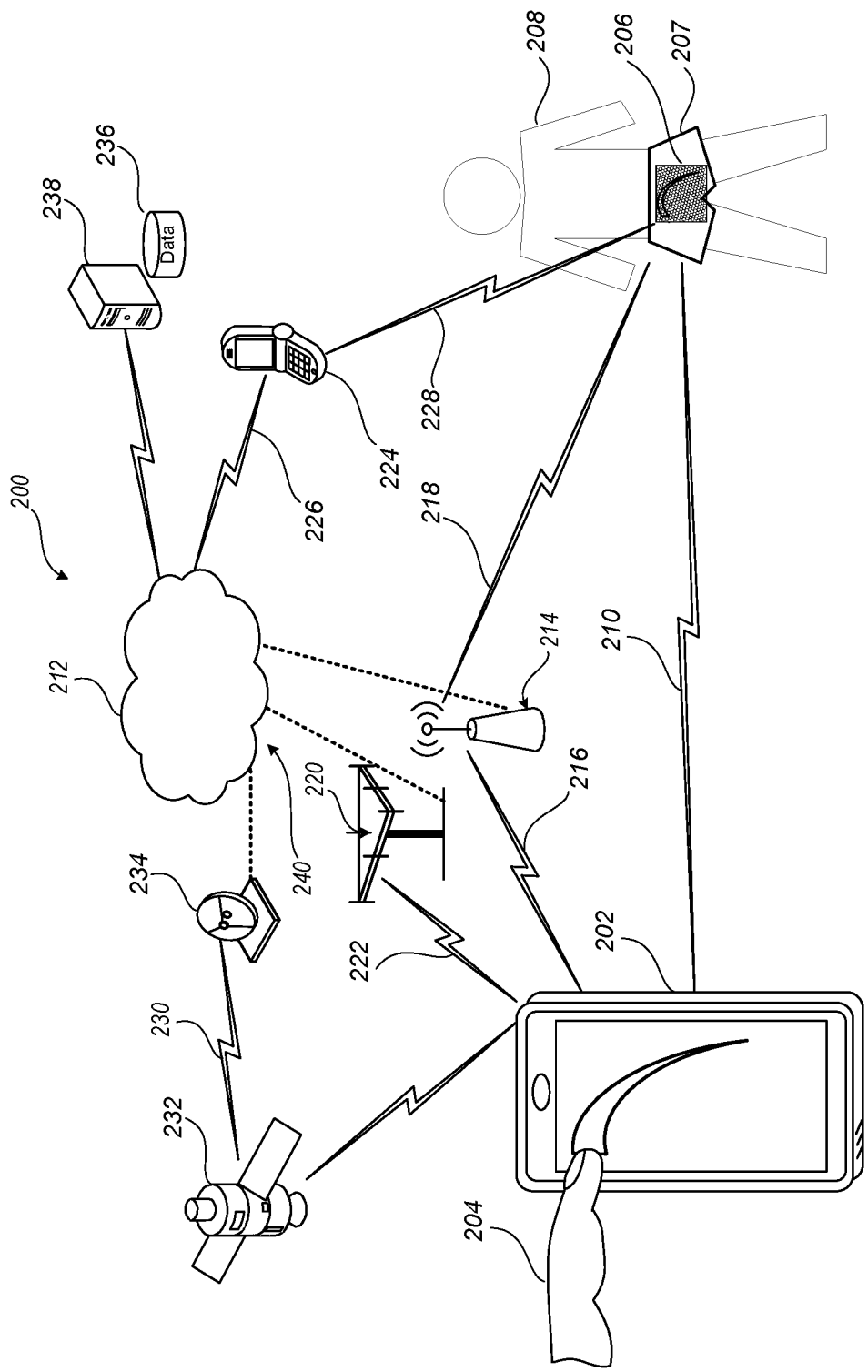
FIG. 2 illustrates a block diagram of another example communication system utilizing multi-modal network protocols in accordance with one or more embodiments.

Referring to FIG. 2, a communication system 200 for remote tactile interaction in accordance with the present disclosure is illustrated. The communication system 200 is an exemplary version of the communication system 100 (FIG. 1). The communication system 200 includes a mobile device 202 (first user device) used by a first user 204 and a vibrotactile device 206 (second user device) configured to be worn on a garment 207 at least in part by a user 208. For example, a direct network 210 may be formed between the mobile device 200 and the vibrotactile device 206. For instance, the direct network 210 can be a wireless ad hoc network, a peer-to-peer network, a personal access network (PAN), etc.

Alternatively, a hosted network 212 can facilitate communication from the mobile device 202 to the vibrotactile device 206. For example, the communication can be carried at least in part over a wireless access network (WLAN) 214, such as with the mobile device 202 as depicted at 216 or with the vibrotactile device 206 as depicted at 218. Alternatively or in addition, communication may be conveyed at least in part via a cellular or Wireless Wide Area Network (WWAN) 220, such as with the mobile device 202 as depicted at 222 or with the vibrotactile device 206. In an exemplary aspect, the latter is depicted as a second mobile device 224 that receives communication over a cellular or WWAN link 226 and relays via a short-range wireless signal 228 to the vibrotactile device 206. Alternatively or in addition, communication over the communication system 200 can be convey at least in part via a satellite network 230, depicted as a satellite 232 that relays communication from the mobile device 202 to a ground station 234. The communication system 200 can also access support processing, such as handling subscriber information 236 managed at a server 238. Portions of the communication system 200 can also be hard wired, such as depicted at 240.

An advantageous development of the invention consists in producing the remote control or remote programming signals for the vibrator in a third apparatus, which can be a further mobile telephone. This may comprise one or more of an antenna, a central control unit, a control keyboard, a microphone, a loudspeaker and a working program memory.

Figure 3:
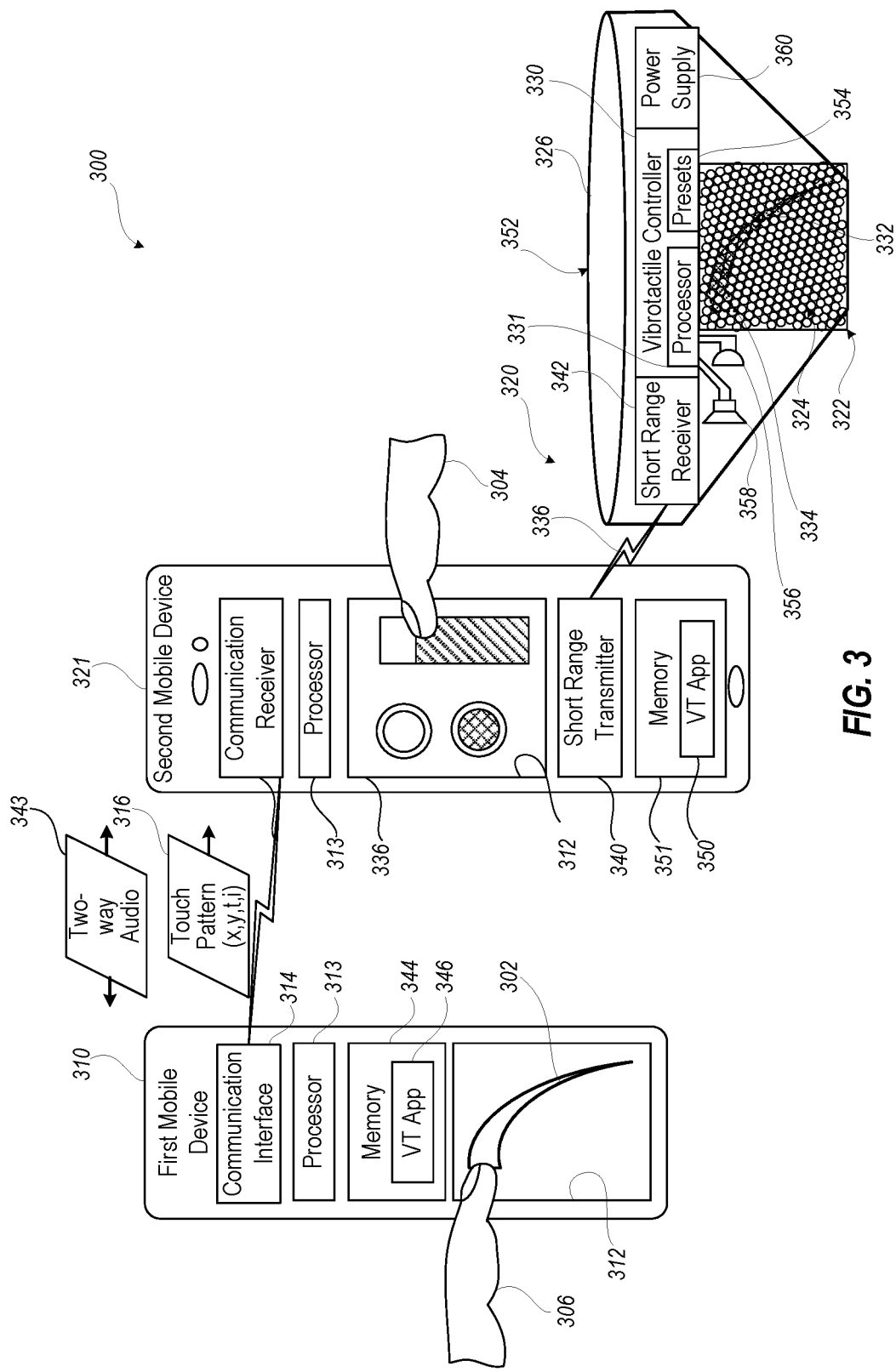
FIG. 3 illustrates a block diagram of an additional example communication system utilizing a distributed architecture for a user device that receives the vibrotactile interaction in accordance with one or more embodiments.

With initial reference to FIG. 3, a communication system 300 according to at least one aspect of the present disclosure enables remote reproduction of a touch pattern 302 (gesture) on a second user 304 (touch recipient) by a first user 306 (touch generator). A first user device, depicted as a first mobile device 310, has a haptic input device, depicted as a touch screen 312, to receive the touch pattern 302 by the first user 306. A processor 313 of the first mobile device characterizes the touch pattern 302 as a function of time and intensity of touch at each of a plurality of array or pixel points of the touch screen 312. A communication interface 314 of the first mobile device 310 communicates touch pattern data 316 based on the characterization of the touch pattern 302 to a network 318.

A second user device or apparatus 320 used by the second user 304 includes a second mobile device 321 and a tactile array 322 of micro-vibratory devices 324 that is attachable (i.e., temporarily or permanently) to a worn item, depicted as a garment 326. It should be appreciated that the garment 326 provides holds the tactile array 322 in contact with the skin of the second user 304. A communication receiver 328 wirelessly receives touch pattern data 316 from the first mobile device 310 via the network 318. A vibrotactile controller 330 responds to the received touch pattern data 316 to by modulating timing and intensity of vibration of selected micro-vibratory devices 332 of the tactile array 322 to generate a reproduction touch pattern 334. In one aspect, the touch screen gestures are translated into multi-dimensional vibrations across the array.

In one embodiment of the invention, a remotely controllable vibrator with the features according to the invention is provided. The advantages of the invention consist particularly in that a vibratory array is activatable not only by remote control aspect of the first mobile device 310, but that the second user 304 may also make certain control inputs remotely via the second mobile device 321, which can also make such control changes convenient and inconspicuous. For example, control commands can be fed to a vibratory micro-array 322 by way of a wireless interface 336, which selectively vary the intensity of the vibrations, and control commands, which influence the duration of the vibrations.

Alternatively or in addition, remote-programming commands can be fed to a vibrator by way of its wireless interface, which serve for programming or reprogramming the vibrator. In addition, a bidirectional signal transmission can take place by way of the wireless interface. The wireless transmission may be Wi-Fi, Bluetooth, cellular signal or other known transmission as depicted as a short-range transmitter 340 of the second mobile device 321 and a short-range receiver 342 attached to the garment 326.

Alternatively, the second mobile device 321 may be carried or affixed to the garment 326 and linked by a cable (not shown) to provide power to the vibratory micro-array 322 as well as control signals. Moreover, the proximity of the communication capabilities of the second mobile device 321 can be used for voice-activated controls and for bi-direction communication ("two-way audio" 343) with the first mobile device 310.

In an exemplary aspect, the first mobile device 310 has a computer-readable memory device 344 that contains a vibrotactile application ("VT App") 346 that is executed by the processor 313 to perform one or more of the functions described herein. The second mobile device 321 similarly has a computer-readable memory device 348 that contains a VT App 350 that is executed by a processor 352 to perform one or more of the functions described herein. For example, the VT App 346 in the first mobile device 310 can be configured in a remote controller mode linked to the VT App 350 in computer readable memory device 351 in the second mobile device 321 that is configured in a remotely controlled mode as depicted. The VT Apps 346, 350 can coordinate bi-directional communication (e.g., voice, video, text, etc.) between the first and second mobile device 310, 321.

In one aspect, worn portions of the second user device, depicted as an integrated vibrating garment 352, serve as a user interface for the second user 304 and provide additional autonomous capabilities. For example, the integrated vibrating garment 352 can include a working program memory in which one or more vibrator working programs are stored, depicted as presets 354 accessed by the vibrotactile controller 330. The vibrotactile controller 330 can further include a microprocessor 331 and audio signal memory (not shown) used with one or more of a microphone 356, a speaker 358 and a power supply 360 to perform as a communication link.

In one aspect, the present disclosure provides for wearable products sold with an array of vibratory actuators or motors included that are controlled by touch screen gestures, which are translated to vibration sensations within the array. This allows translation of movements, gestures and pressures to the remote source in a similar two-dimensional manipulation of the gestures provided to the touch screen 312.

It should be appreciated with the benefit of the present disclosure that aspects of the present invention can extend to placements other than a garment worn in contact with the genitalia. In another embodiment, micro-vibration arrays are incorporated into pads or clothing for various parts of the body. For example, a shirt (or just a pad that covers all or part of the shoulders) can incorporate the micro-vibration array such that someone can manipulate a touch screen in one locale and affect a massage of proportional movement and pressures on the remote subject.

In another embodiment, the vibrator array comprises a microcontrollers central control element. This produces control signals for a resonator device, to which resonators belong. Each of these resonators is separately controllable by the microcontroller so that the strength and duration of the vibration is individually controllable for each of the resonators.

The vibrator is remotely controllable by means of the further touch screen wireless apparatus, particularly a mobile telephone. For example, control commands can be emitted by the mobile telephone, which influence the strength and duration of the vibrations of the resonator array of the vibrator. Moreover, the mobile telephone can also be used as a programming tool for the vibrator, which transmits to the vibrator programming commands, which serve for setting up or modification of a vibrator working program and are stored in the working program memory of the vibrator.

The received signals can be remote control commands by means of which the strength of the vibrations of the resonator array or the duration of the vibrations of the resonator array is influenced. Moreover, the received signals can be a selection command by means of which one of the working programs stored in the working program memory is selected and converted by the microcontroller into control commands for the resonator array. The received signals can moreover be a programming command, which is supplied to the working program memory of the vibrator.

The microcontroller is furthermore provided for the purpose of making available acknowledgement or response signals, which are transmitted by way of the wireless signal interface of the wireless signal connection to the mobile telephone. These acknowledgement or response signals can be signals which were received by the microphone, signals which were derived from the audio signal memory or signals which were generated by the microcontroller itself, for example in the sense of a program dialogue or in the sense of a transmission of a charging state signal for the battery.

In accordance with the afore-described form of embodiment a mobile telephone, which has a wireless signal interface, is accordingly used for the purpose of transmitting wire-free control and/or programming commands by way of a bidirectional wireless signal connection to a vibrator similarly provided with a wireless signal interface. The vibrator is provided with a microcontroller, which is in a position of sending back acknowledgement or response signals to the mobile telephone.

The device can be applied to clothing, bed sheets, shoes, gloves, sports handles, steering wheel covers, or sexual devices that can be inserted into or placed outside of sexual organs. The end action that is developed in the device can include temperature, vibration, electrical stimulus, sound, or a combination of the above.

Consistent with at least one aspect of the present disclosure, an apparatus can be worn by a male user for providing sexual stimulus from the partner of the user. The apparatus comprises one or multiple vibrating or stimulating elements that are supported in a fabric architecture. The garment has a cup and supportive design that allows for the support of the male genitalia. The vibration device is anatomically suited for the male subject with actuating stimulators in multiple sites around and behind the cup. Stimulation will be able to be done through remote means using cellphone, wireless, infrared, or Bluetooth technology.

Consistent with another aspect of the present disclosure, vibrating panty also known as vibrating thong or vibrating undies is a type of clitoral hands-free vibrator that is used mainly by female users with the purpose to receive sexual stimulation. Male versions of the device have been difficult because of anatomic changes in the penis during stimulation that prevents consistent stimulation in appropriate areas of the genitalia. The female sex toy features the conjunction of a female piece of lingerie and a vibrating element inserted. The vibrating bullet or some other shaped elements is located against the female genitalia: clitoris and labia, but there are also some penetrative sex toys attached from the inner side of the panties for stimulating the vaginal erogenous zones. The panties are intended for keeping the vibrator in place, while activating and in many cases for wearing it comfortably under the clothes. A slightly raised area may be provided to enhance contact with specific body regions such as the clitoral region of the wearer.

There are the following types of vibrating panties that are produced by the sex toys industry:

Remote control vibrating panty: This is a discreet vibrator operated from a remote-control device that can usually work at the distance of up to several meters. The panties' vibrator is controlled by users or by their partners during foreplay or during masturbation. Some women wear the remote-control panties under their clothes and turn the vibrating bullet on wherever they wish. Usually such models are designed noiseless for hiding the sound of vibrating element.

Crotchless vibrating panty. This model is designed for using during the intercourse. The crotchless panties are intended for easy access to the genitalia, with a vibrating bullet massaging the clitoris. Vibrating panty with removable bullet. Some vibrating elements of the panties are designed for removing and using in any other erotic activities. The bullet is inserted into a special hidden pouch placed in the inner side of the panties. But there are also attachable bullets used with any panties, thongs or G-strings. Generally, small batteries, such as watch batteries, operate the bullet. Vibrating panties are usually made out of the normal fabrics used in manufacturing the female lingerie: nylon, cotton, mesh, lace, leather, etc., as well as latex. In all cases the material is stretchable to fit many sizes and comfortable for wearing for extended periods of time. Description of the product: The male vibrating undergarment is comprised of flexible woven material back panels with an anterior cup architecture. The front of the garment is composed of flexible woven mesh reinforced with a fibrous netting that allows the genitalia of the male to be separated from the body of the undergarment without major compression against the body with additional separation of the penis and scrotum. The vibration nodes are interspersed behind the cup and the main body of the underwear in an area that would be behind the scrotal mass and along the base of the penis in front of the scrotum. Stimulation would be consistently in areas that would not significantly change with penile engorgement.

Figure 4:
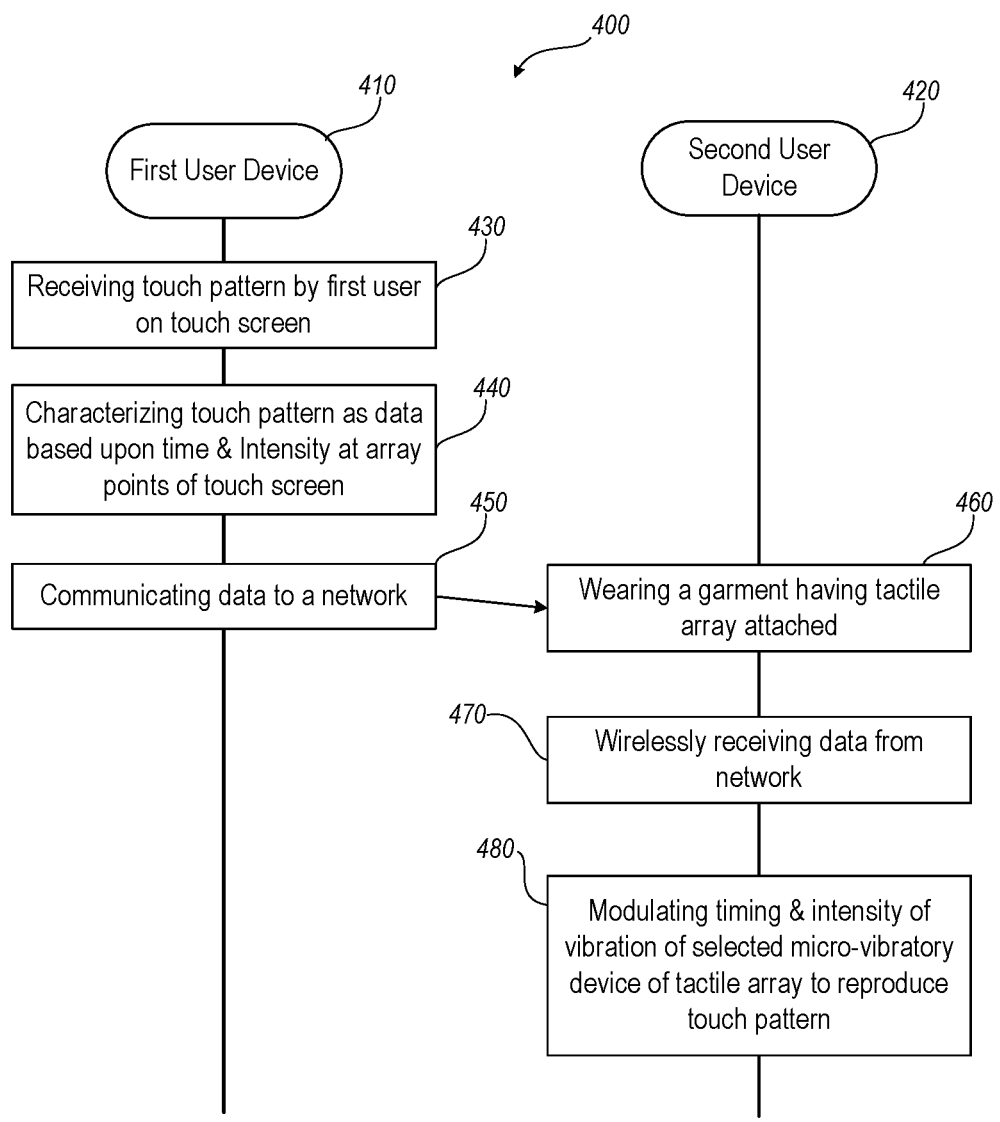
FIG. 4 is a flow chart illustrating a method for remote vibrotactile interaction in accordance with one or more embodiments.

Turning to FIG. 4, a method 400 is provided for remotely reproducing a touch pattern or gesture input at a first user device 410 as a vibrotactile output at a second user device 420. At a touch screen of the first user device, a touch pattern by a first user is received (block 430). The first user device 410 characterizes the touch pattern as a touch pattern data based upon time and intensity of touch at a plurality of array points of the touch screen (block 440). The first user device 410 communicates the touch pattern data to a network (block 450).

In block 460, a second user wears attached to a garment a tactile array of micro-vibratory devices as at least a part of the second user device 420. The touch pattern data is wirelessly received from the first user device via the network (block 470). The second user device 420 modulates timing and intensity of vibration of selected micro-vibratory devices of the tactile array in response to the touch pattern data to reproduce the touch pattern (block 480).

In one or more embodiments, the present disclosure provides a communication system for remote vibrotactile interaction, comprising: (a) a first user device comprising: (i) a touch screen to receive a two-dimensional touch pattern by a first user and to characterize the touch pattern as a touch pattern data of a human gesture based upon time and intensity of touch at a plurality of array points of the touch screen, and (ii) a communication interface to communicate the touch pattern data to a network; and (b) a second user device, comprising: (i) a tactile array of micro-vibratory devices attachable to a garment, (ii) a communication receiver to wirelessly receive the touch pattern data from the first user device via the network, and (iii) a vibrotactile controller responsive to the received touch pattern data to modulate timing and intensity of vibration of selected micro-vibratory devices of the tactile array to proportionally reproduce the two-dimensional touch pattern of the human gesture.

In an exemplary embodiment, the first user device comprises a first mobile communication device, and wherein the second user device comprises a second mobile device and an integrated vibrator garment in wireless communication with the second communication device. In one particular embodiment, the integrated vibrator garment further comprises a two-way audio communication system. In another particular embodiment, the second mobile device comprises a user interface control to wirelessly control the integrated vibrator garment. In an exemplary embodiment, the user interface control comprises a value for strength and/or duration of vibration.

In one or more embodiment, the garment comprises a conforming material to hold the tactile array into physical contact with skin of the second user. In one or more embodiments, the integrated vibrator garment further comprises a temperature sensor to detect a body temperature value. The second user device further comprises a communication interface to wirelessly communicate the body temperature value over the network to the first user device. The first user device displays information related to the body temperature value.

In one or more embodiments, the touch screen of the first user device receives the two-dimensional touch pattern as a function of time by the first user. The vibrotactile controller proportionally reproduces the two-dimensional touch pattern according to the function of time.

According to one aspect of the present innovation, a method is provided for remotely reproducing a touch pattern or gesture as a vibrotactile output. In one or more embodiments, the method includes, at a touch screen of a first user device: (a) receiving a two-dimensional touch pattern of a human gesture by a first user, (b) characterizing the touch pattern as a touch pattern data based upon time and intensity of touch at a plurality of array points of the touch screen, and (c) communicating the touch pattern data to a network. The method includes, at tactile array of micro-vibratory devices attached to a garment worn by a second user: (a) wirelessly receiving the touch pattern data from the first user device via the network, and (b) modulating timing and intensity of vibration of selected micro-vibratory devices of the tactile array in response to the touch pattern data to proportionally reproduce the two-dimensional touch pattern of the human gesture.

In one or more embodiments, the method further includes: (a) receiving the touch pattern by the first user on a touch screen of a first mobile device; (b) communicating the touch pattern data to the network comprising a wireless wide area network; (c) receiving the touch pattern data at a second mobile device of the second user; (d) wirelessly relaying the touch pattern data to an integrated vibrator garment comprising the tactile array; and (e) wirelessly receiving the touch pattern data at the integrated vibrator garment. In a particular embodiment, the method further includes transmitting two-way audio communication between the first mobile device and the integrated vibrator garment relayed by the second mobile device.

In another particular embodiment, the method includes: (a) receiving a control input by the second user at the second mobile device; and (b) wirelessly communicating the control input from the second mobile device to the integrated vibrator garment. In a first exemplary embodiment, the control input comprises a value for strength of vibration that is proportional to the touch pattern by the first user. In a second exemplary embodiment, the control input comprises a value for duration of vibration that matches the duration of the touch pattern by the first user.

In one or more embodiments, the method further includes (a) detecting a body temperature value by a temperature sensor connected to integrated vibrator garment; (b) wirelessly communicating the body temperature value over the network to the first user device; and (c) displaying information related to the body temperature value on the first user device.

The device may also communicate audibly using audio codec, which may receive spoken information from a user and convert it to usable digital information. Audio codec may likewise generate audible sound for a user, such as through a speaker, e.g., in a handset of device. Such sound may include sound from voice telephone calls, may include recorded sound (e.g., voice messages, music files, etc.) and may also include sound generated by applications operating on device. This device may optionally include a GPS receiver chipset or other location-determining subsystem.

Figure 5:
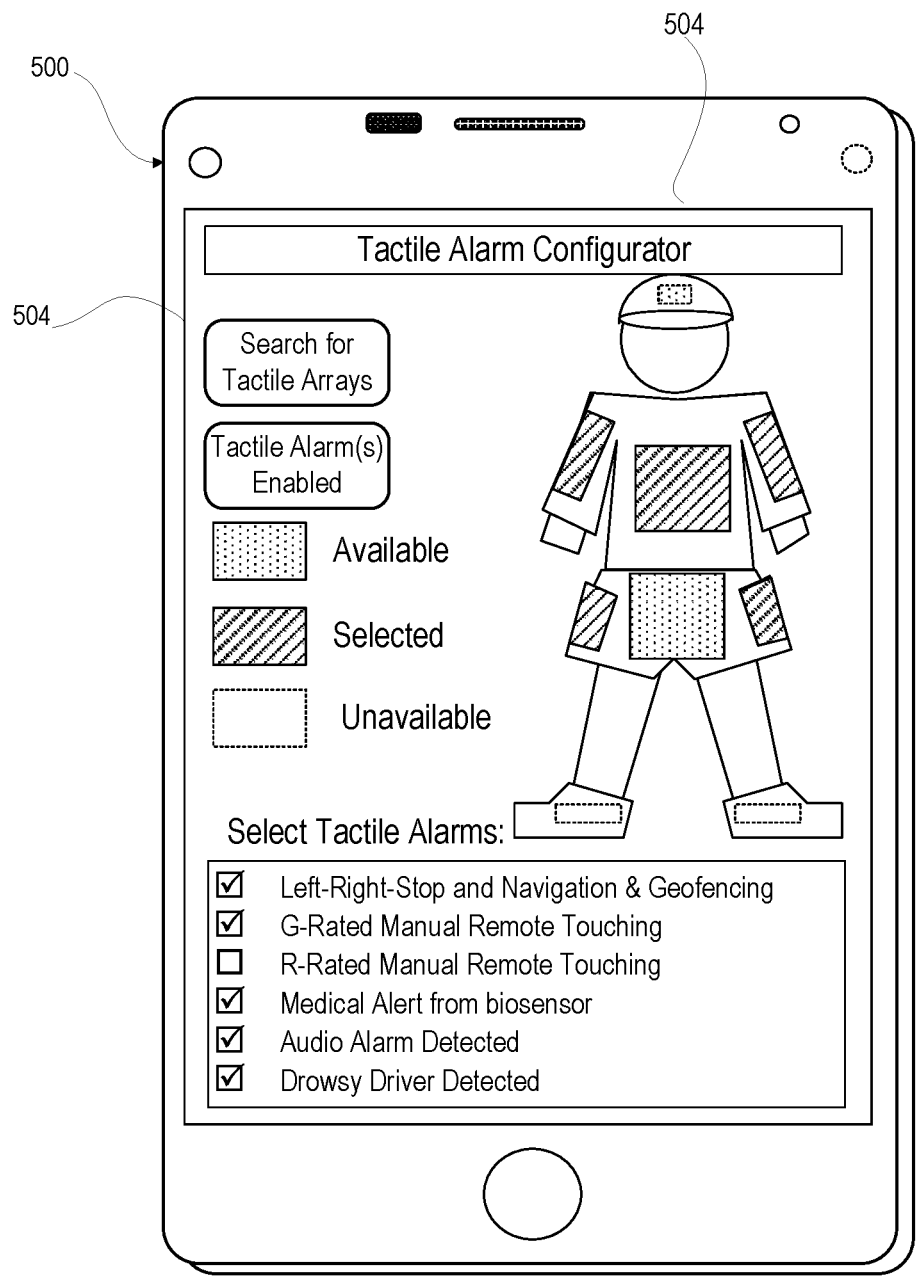
FIG. 5 is a front view of a user interface of a mobile device presenting a tactile alarm configuration page, according to one or more embodiments.

Another advantageous development of the invention consists in additionally equipping the device with a temperature sensor that is connected with the microcontroller. This allows detection and recording of data relating to the monthly cycle of a woman or for indicating states of arousal. These data can be transmitted by way of the wireless signal connection BT to the mobile telephone and represented on the display thereof FIG. 5 illustrates a first user device 500 as a mobile computing device that may be implemented in a number of different forms, as shown in the figure. For example, it may be implemented as a cellular telephone. It may also be implemented as part of a smartphone, personal digital assistant, or other similar mobile device. Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A user interface device 502 of the first user device 500 can present a tactile alarm configurator 504 that is used to enable various alert generating applications and remote tactile communication channels: (i) left-right-stop navigation; (ii) geofencing; (iii) G-rated manual remote touching; (iv) mature-rated manual remote touching; (v) medical alert from biosensor; (vi) audio alarm detection; (vii) drowsy driver detected; (vii) collision detection, etc.

Figure 6:
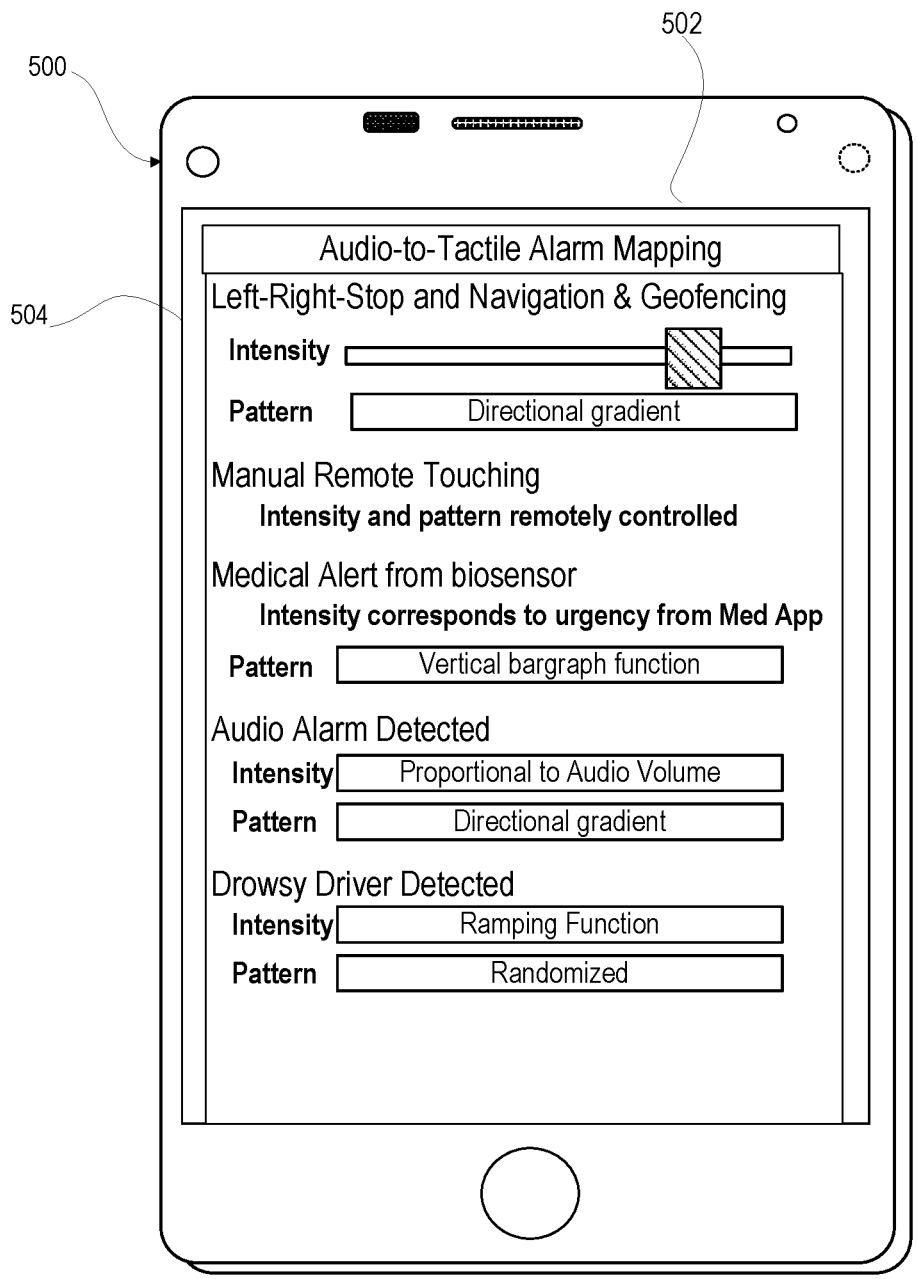
FIG. 6 is a front view of a user interface of a mobile device presenting an audio-to-tactile alarm mapping page, according to one or more embodiments.

FIG. 6 illustrates that user interface device 502 of the first user device 500 can present an audio-to-tactile alarm mapping page 506 wherein the intensity, pattern, directivity, etc., can be customized for a particular user or default settings viewed.

Figure 7:
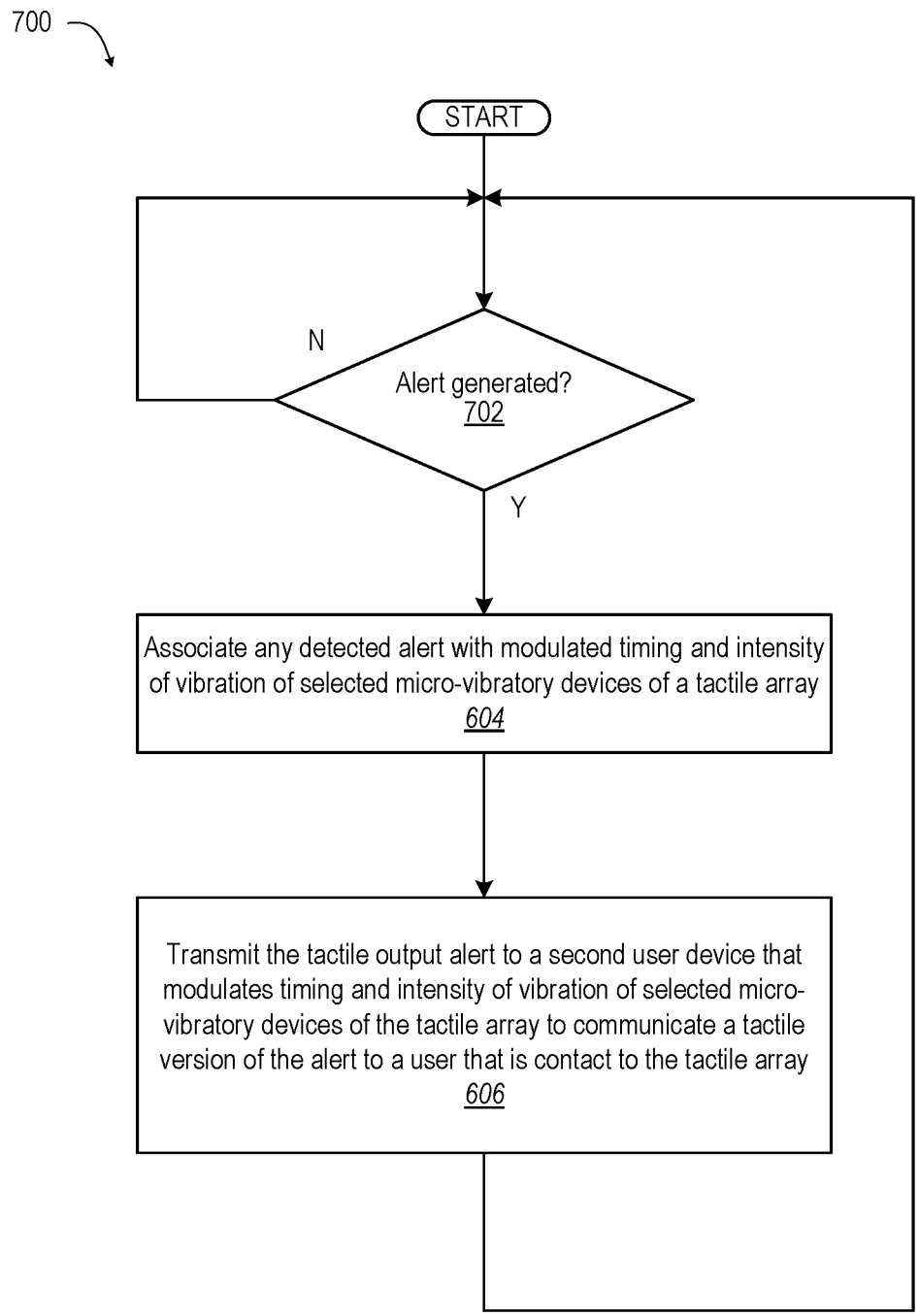
FIG. 7 is a flow chart of a method of remote vibrotactile interaction between user devices, according to one or more embodiments.

FIG. 7 illustrates a method 700 of remote vibrotactile interaction between user devices. In one or more embodiments, method 700 begins determining whether an alert generating application of a first user device has generated an alert (decision block 702). In response to determining that an alert has not been generated, method 700 returns to block 702 to continue monitoring. In response to determining that an alert has been generated, method 700 includes associating any detected alert with modulated timing and intensity of vibration of selected micro-vibratory devices of a tactile array (block 704). Method 700 includes transmitting the tactile output alert to a second user device that modulates timing and intensity of vibration of selected micro-vibratory devices of the tactile array to communicate a tactile version of the alert to a user that is in contact to the tactile array (block 706). Then method 700 returns to block 702 to continue monitoring.

In one or more embodiments, the tactile array of micro-vibratory devices are attached to a flexible substrate to form the first vibration textile that is attachable to the surface of a selected one of: (i) a garment; and (ii) a chair by a selected one of: (i) stitching; (ii) Velcro; (iii) adhesive; and (iv) pocketed insertion.

In one or more embodiments, the alert comprises a pedestrian proximity alert of an approaching vehicle.

In one or more embodiments, method 700 includes generating the alert that characterizes any audio alerts detected by a microphone of the first user device.

In one or more embodiments, method 700 includes generating the alert in response to a violation of a geofence limitation. In a particular embodiment, method 700 includes generating the alert in response to the violation of the geofence limitation by a third user device used by another user.

In one or more embodiments, method 700 includes: (i) receiving a directional vehicle proximity warning from a vehicle; and (ii) generating the tactile output alert that contains directional information in selecting one of first and second vibration textiles positioned against opposing sides of the user.

In one or more embodiments, method 700 includes: (i) detecting a physiological value of the user that correlates to a monitored health condition; and (ii) generating the alert based on the monitored health condition.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Device functions other than those described herein may be controlled via gestures. Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

In the above-described flow chart, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A communication system for remote vibrotactile interaction, the communication system comprising a first and second user device, wherein:

the first user device comprises:
   a communication interface to communicate to a network; and
   a first vibrotactile controller in communication with the communication interface and the user interface device and that executes: (i) an alert generating application; and (ii) a tactile alert utility that causes the first user device to:
      determine whether the alert generating application has generated an alert;
      associate the alert with modulated timing and intensity of vibration of selected micro-vibratory devices of a tactile array; and transmit a tactile output alert to the second user device; and the second user device, comprises:
- a surface that is one of: (i) worn in contact to a user; and (ii) supports the user;
- a tactile array of micro-vibratory devices attachable as a first vibration textile to a portion of the surface in contact at least intermittently with the user;
- a communication receiver to wirelessly receive the tactile output alert from the first user device via the network, and
- a second vibrotactile controller responsive to the received tactile output alert to modulate timing and intensity of vibration of selected micro-vibratory devices of the tactile array, wherein:

the communication interface comprises a vehicle warning interface that receives directional vehicle proximity warnings from a vehicle; and second user device comprises a second vibration textile that is attachable to another surface that is against another side of the user; the tactile output alert contains directional information in selecting one of the first and second vibration textiles.

2. The communication system of claim 1, wherein the tactile array of micro-vibratory devices are attached flexible substrate to form the first vibration textile that is attachable to the surface by a selected one of: (i) stitching; (ii) Velcro; (iii) adhesive; and (iv) pocketed insertion.

3. The communication system of claim 2, wherein one or more vibration textiles are attached to a selected one of: (i) a garment; and (ii) a chair.

4. The communication system of claim 1, wherein the alert generating application that generates the alert comprises a pedestrian proximity alert of an approaching vehicle.

5. The communication system of claim 1, wherein:
first user device comprises a microphone that detects audio alerts in an ambient environment; and
the alert generating application that generates the alert comprises an audio-to-tactile alarm converter that categorizes any audio alerts detected by the microphone.

6. The communication system of claim 1, wherein:
first user device comprises: (i) a motion sensor that detects whether the user is in a vehicle; and (ii) a biosensor that detects a physiological value of the user that correlates to a level of alertness; and
the alert generating application that generates the alert is in communication with the motion sensor and the biosensor and comprises a drowsy driver alarm generator.

7. The communication system of claim 1, wherein:
first user device comprises a geographic location finder that detects where the first user device is located; and
the alert generating application that generates the alert is in communication with the geographic location finder and comprises a geofence application that generates the alert in response to a violation of a geofence limitation.

8. The communication system of claim 7, wherein:
the communication interface is in communication with a third user device of another user that is associated with the geofence limitation; and
the alert generating application generates the alert in response to the violation of the geofence limitation by the third user device.

9. The communication system of claim 1, wherein:
first user device comprises a biosensor that detects a physiological value of the user that correlates to a monitored health condition; and
the alert generating application that generates the alert is in communication with the biosensor and comprises a health alert generator.

10. A method of remote vibrotactile interaction between user devices, the method comprising:
determining whether an alert generating application of a first user device has generated an alert based on receiving a directional vehicle proximity warning from a vehicle; and
associating the alert with modulated timing and intensity of vibration of selected micro-vibratory devices of a tactile array by generating the tactile output alert that contains directional information in selecting one of first and second vibration textiles positioned against opposing sides of the user; and
transmitting the tactile output alert to a second user device that modulates timing and intensity of vibration of selected micro-vibratory devices of the tactile array.

11. The method of claim 10, wherein the tactile array of micro-vibratory devices are attached to a flexible substrate to form the first vibration textile that is attachable to the surface of a selected one of: (i) a garment; and (ii) a chair by a selected one of: (i) stitching; (ii) Velcro; (iii) adhesive; and (iv) pocketed insertion.

12. The method of claim 10, wherein the alert comprises a pedestrian proximity alert of an approaching vehicle.

13. The communication system of claim 10, further comprising generating the alert that characterizes any audio alerts detected by a microphone of the first user device.

14. The method of claim 10, further comprising generating the alert in response to a violation of a geofence limitation.

15. The method of claim 14, further comprising generating the alert in response to the violation of the geofence limitation by a third user device used by another user.

16. The communication system of claim 10, further comprising:
detecting a physiological value of the user that correlates to a monitored health condition; and
generating the alert based on the monitored health condition.

* * * * *